United States Patent
Ohtani et al.

(10) Patent No.: US 6,557,439 B2
(45) Date of Patent: May 6, 2003

(54) DRIVING FORCE DISTRIBUTING STRUCTURE FOR FOUR WHEEL DRIVE VEHICLE

(75) Inventors: Tetsuya Ohtani, Saitama (JP); Tadayasu Sanpe, Saitama (JP); Nobuo Takemasa, Saitama (JP); Takashi Hotta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 09/735,644

(22) Filed: Dec. 14, 2000

(65) Prior Publication Data

US 2002/0124686 A1 Sep. 12, 2002

(30) Foreign Application Priority Data

Dec. 17, 1999 (JP) .......................... 11-358453

(51) Int. Cl.$^7$ .............................................. B60K 17/34
(52) U.S. Cl. ..................... 74/665 F; 180/233
(58) Field of Search .................... 74/665 F, 665 H, 74/325, 359, 375; 475/200, 206; 180/233

(56) References Cited

U.S. PATENT DOCUMENTS 4,450,734 A * 5/1984 Makishima ................. 475/206
4,618,022 A * 10/1986 Hayashi ...................... 180/233
5,143,167 A * 9/1992 Moriyama et al. .......... 180/248
5,188,574 A * 2/1993 Echigo et al. ............... 475/200
5,348,516 A * 9/1994 Shibata ....................... 475/206

FOREIGN PATENT DOCUMENTS

JP          5-58178          3/1993

* cited by examiner

Primary Examiner—Ankur Parekh
(74) Attorney, Agent, or Firm—Armstrong, Westerman & Hattori, LLP

(57) ABSTRACT

In a transmission in which transmission mechanisms ($1^{st}$ speed, $2^{nd}$ speed, $3^{rd}$ speed and reverse transmission mechanisms 11, 12, 13, 14) are disposed between transmission input and output shafts 1, 2 which are parallel with each other, a structure in which a driving force is distributed from the output shaft 2 for transmission to front and rear wheels of a vehicle comprising an intermediate rear wheel driving gear 32 rotatably disposed on the input shaft 1, a front wheel side driving gear 3a fixed to the output shaft for transmitting the driving force to the front wheels, a first rear wheel driving gear 31 fixed to the output shaft so as to mesh with the intermediate gear and a second rear wheel driving gear 33 rotatably disposed on a rear wheel driving rotating shaft 35 which is parallel with the input shaft and adapted to mesh with the intermediate rear wheel driving gear so as to transmit the driving force to the rear wheels.

6 Claims, 5 Drawing Sheets

DRIVING FORCE DISTRIBUTING STRUCTURE FOR FOUR WHEEL DRIVE VEHICLE

BACKGROUND OF THE INVENTION

1. Field of the Invention

The present invention relates to a driving force distributing structure for four wheel drive vehicles distributing a driving force from an output shaft of a transmission to front and rear wheels, respectively.

2. Description of the Related Art

In automobiles, there are four wheel drive vehicles in which an output from an engine is transmitted to front and rear wheels (i.e., all wheels) thereof, and vehicles of this type are constructed such that the output from the engine is first in speed at a transmission and is then split to be transmitted to the front and rear wheels. Due to this, it is common practice to provide as a transmission, a driving force distributing structure for four-wheel drive vehicles having engine output distributing portions for front and rear wheel sides, respectively. For example, JP-A-5-58178 discloses a driving force distributing structure for four-wheel drive vehicles of this type. In this construction, a transmission is disposed to be joined to an output side of a transverse-mounted engine which is disposed to extend in a transverse direction of a vehicle, and two independent gear trains are provided which are adapted to mesh with an output gear disposed at a terminal end of the transmission, wherein one of the two gear trains is connected to the front wheels side and the other to the rear wheels side.

In the case of the above related driving force distributing structure for four-wheel drive vehicles, since there are provided two independent gear trains which mesh with the output gear disposed at the terminal end portion of the transmission, the terminal end portion of the transmission largely protrudes in an axial direction, and this causes a problem that the transmission is made large in size and heavy in weight. In addition, since the driving output is obtained from the output gear at the terminal end portion of the transmission for the front and rear wheels, there is also caused a problem that the driving output obtaining positions are largely restricted.

SUMMARY OF THE INVENTION

The present invention was made in view of the problems, and an object thereof is to provide a driving force distributing structure for a four wheel drive vehicle which can be made compact in size and light in weight. The other object of the invention is to provide a driving force distributing structure for a four wheel drive vehicle which can provide a high degree of freedom with respect to the driving force distributing position.

With a view to attaining those objects, according to an aspect of the invention, there is provided in a transmission having transmission mechanisms (for example, a $1^{st}$ speed transmission mechanism 11, a $2^{nd}$ speed transmission mechanism 12, a $3^{rd}$ speed transmission mechanism 13 and a reverse transmission mechanism 14 which will be described with reference to an embodiment) disposed between an input shaft (for example, a transmission input shaft 1 in the embodiment) and an output shaft (for example, a transmission output shaft 2 in the embodiment) which are disposed in parallel with each other, a driving force distributing structure for a four wheel drive vehicle for distributing a driving force from said output shaft for transmission to front and rear wheels of a vehicle, the driving force distributing structure for a four wheel drive vehicle having an intermediate gear (for example, an intermediate gear 32 for driving the rear wheels in the embodiment) relatively rotatably disposed on the input shaft, a first gear (for example, a front wheel side driving gear 3a in the embodiment) fixed to the output shaft and adapted to transmit the driving force to one of the front and rear wheels, a second gear (for example, a first gear 31 for driving the rear wheels) fixed to the output shaft and adapted to mesh with the intermediate gear, and a third gear (for example, a second gear 33 for driving rear wheels in the embodiment) disposed rotatably about a rotating shaft (for example, a rotating shaft 35 for driving the rear wheels in the embodiment) parallel with the input shaft and the output shaft and adapted to mesh with the intermediate gear so as to transmit the driving force to the other of the front and rear wheels.

According to the driving force distributing structure for a four wheel drive vehicle constructed as described above, although the driving force is distributed from the first gear fixed to the output shaft to one of the front and rear wheels, since the first gear is independent from the driving force distributing portion from which the driving force is distributed to the other of the front and rear wheels, the degree of freedom with respect to the disposing position of the first gear is increased, and the degree of freedom with respect to the position of the driving force distributing portion for one of the front and rear wheels is also increased. In addition, since the gear train is used for distributing the driving force to the other of the front and rear wheels which includes the second gear fixed to the output gear, the intermediate gear rotatably disposed on the input shaft and the third gear disposed on the rotating shaft parallel with the input and output shafts and adapted to mesh with the intermediate gear which are arranged in linear fashion, only an axial dimension is required for allowing for the gear train comprising the gears arranged in a linear fashion within the transmission, thereby making it possible to prevent the increase in dimension in the axial direction of the transmission. Furthermore, the position of the gear train comprising the linearly arranged gears can be adjusted in the axial direction within the transmission relatively easily, this helping increase the degree of freedom with respect to the position of the distributing portion of the driving force for the other of the front and rear wheels.

DETAILED DESCRIPTION OF THE PREFERRED EMBODIMENTS

Figure 2:
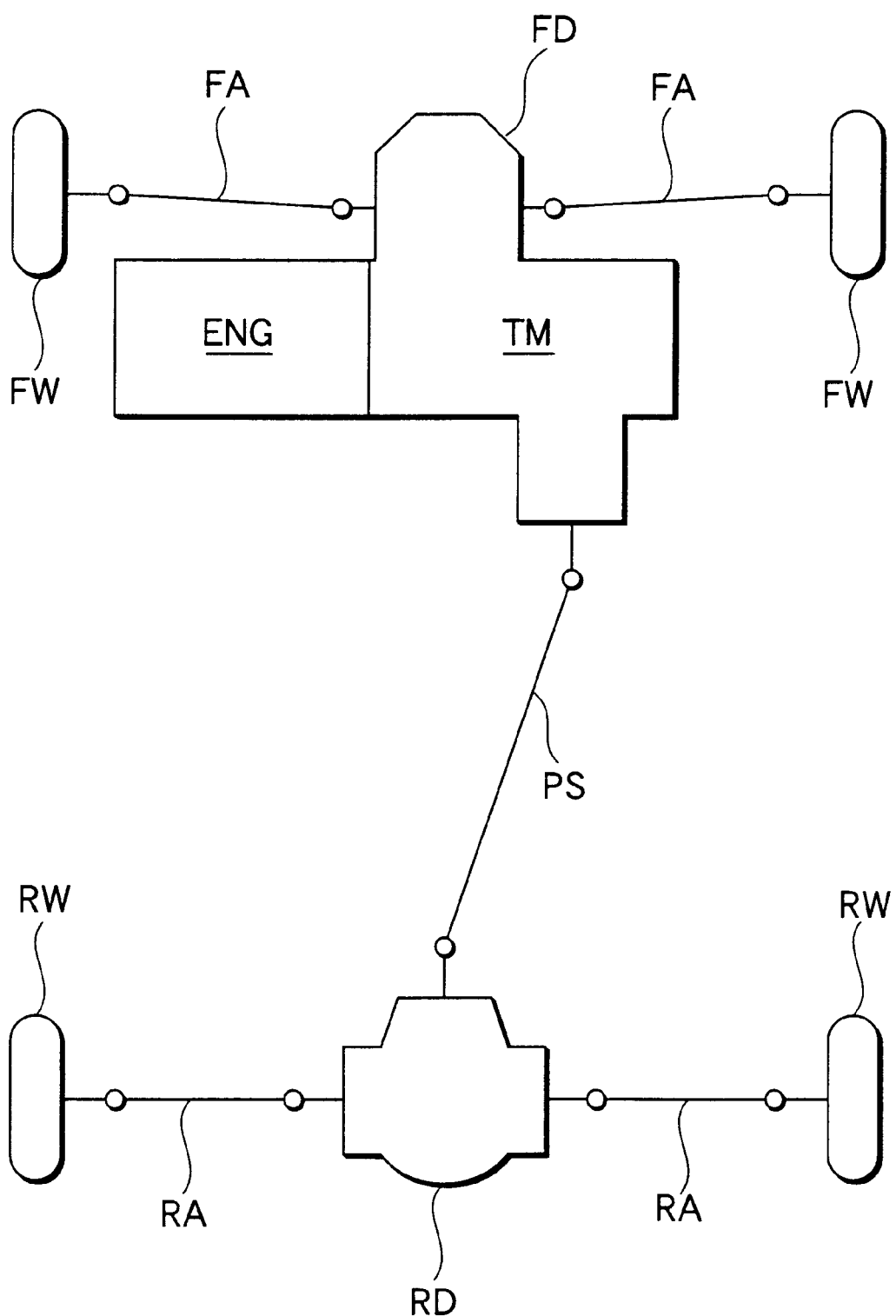
FIG. 2 is a schematic diagram showing a drive train system of an automobile incorporating therein the above transmission.

Referring to the accompanying drawings, preferred embodiments according to the invention will be described below. First, a drive train system of an automobile provided with a driving force distributing structure for a four wheel drive vehicle according to the invention is shown in FIG. 2. In this drive train system, a transmission TM is disposed to be joined to an output end portion of a transverse-mounted engine ENG, and a driving force is constructed so as to be transmitted from the transmission TM to front wheels FW and rear wheels RW. A front differential mechanism FD is disposed on the transmission TM, and a rotational driving force from the transmission TM is transmitted to the front differential mechanism FD, and the rotational driving force so transmitted is then further transmitted from the front differential mechanism FD to the left and right front wheels FW via left and right front axle shafts FA. The rotational driving force is also transmitted to a rear differential mechanism RD from the transmission TM via a propeller shaft PS, and the rotational driving force so transmitted is then further transmitted from the rear differential mechanism RD to the left and right rear wheels RW via left and right axle shafts RA.

Figure 3:
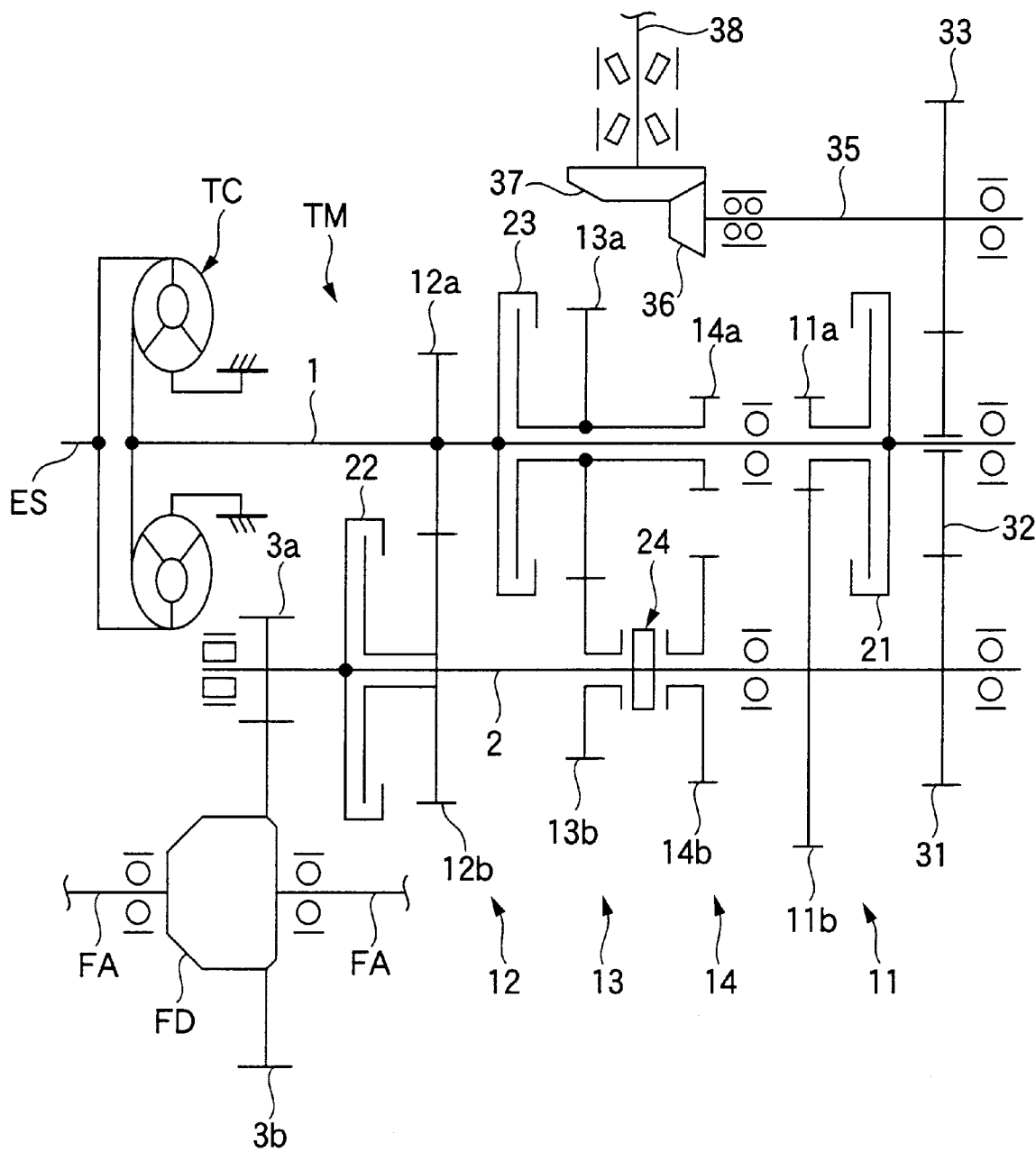
FIG. 3 is a schematic diagram showing a drive train system in the transmission.

The driving force distributing structure for a four wheel drive vehicle is provided within the transmission TM in such a manner that the driving force is obtained, from the transmission TM to the front and rear wheel sides as described above, and the construction of the transmission incorporating therein the driving force distributing structure for a four wheel drive vehicle will be described with reference to FIGS. 1 and 3. The transmission TM is constructed so as to have a torque converter TC connected to an engine output shaft ES, a transmission input shaft 1 connected to the output shaft (a turbine shaft) of the torque converter TC, a transmission output shaft 2 disposed in parallel with the transmission input shaft 1 and transmission mechanisms disposed between the transmission input and output shafts 1, 2 which are all disposed within a transmission housing HSG joined to the engine ENG.

The transmission is constituted by a $1^{st}$ speed transmission mechanism 11, a $2^{nd}$ speed transmission mechanism 12, a $3^{rd}$ speed transmission mechanism 13 and a reverse transmission mechanism 14. The $1^{st}$ speed transmission mechanism 11 comprises a $1^{st}$ speed driving gear 11a rotatably disposed on the input shaft 1, a $1^{st}$ speed follower gear 11b adapted to mesh with the $1^{st}$ speed driving gear 11a and fixedly provided on the transmission output shaft 2, and a $1^{st}$ speed clutch 21 disposed on the transmission input shaft 1. The $2^{nd}$ speed transmission mechanism 11 comprises a $2^{nd}$ speed driving gear 12a fixedly provided on the transmission input shaft 1, a second follower gear 12b adapted to mesh with the $2^{nd}$ speed driving gear 12a and rotatably disposed on the transmission output shaft 2, and a $2^{nd}$ speed clutch 22 disposed on the transmission output shaft 2. The $3^{rd}$ speed transmission mechanism 13 comprises a $3^{rd}$ speed driving gear 13a rotatably disposed on the transmission input shaft 1, a $3^{rd}$ speed follower 13b adapted to mesh with the $3^{rd}$ speed driving gear 13a and rotatably disposed on the transmission output shaft 2, a $3^{rd}$ speed and reverse clutch 23 and a $3^{rd}$ speed and reverse dog clutch 24 disposed on the transmission output shaft 2. The reverse transmission mechanism 14 comprises a reverse driving gear 14a rotatably disposed on the transmission input shaft 1, a reverse follower gear 14b adapted to mesh with the reverse driving gear 14a via a reverse idler gear, not shown, and rotatably disposed on the transmission output shaft 2, the $3^{rd}$ and reverse clutch 23 disposed on the transmission input shaft 1 and the $3^{rd}$ speed and reverse dog clutch 24 disposed on the transmission output shaft 2. Note that the $3^{rd}$ speed driving gear 13a and the reverse driving gear 14a are integrally connected to each other.

In the transmission constructed as described above, when the $1^{st}$ speed clutch 21 is brought into engagement, the st speed driving gear 11a rotates integrally with the input shaft 1, and the rotation is transmitted to the $1^{st}$ speed follower gear 11b which meshes with the $1^{st}$ speed driving gear 11a, whereby the transmission output shaft 2 rotates at rotating speed which is changed so as to correspond to a gear ratio of the $1^{st}$ speed gear train. Similarly, when the $2^{nd}$ speed clutch 22 is brought into engagement, the $2^{nd}$ follower gear 12b connects to the transmission output shaft 2, and as a result of this, the rotations of the input shaft are transmitted from the $2^{nd}$ speed driving gear 12a rotating together with the input shaft 1 to the $2^{nd}$ speed follower gear 12b meshing with the $2^{nd}$ speed driving gear 12a, whereby the transmission output shaft 2 rotates at rotating speed which is changed so as to correspond to a gear ratio of the $2^{nd}$ speed gear train.

In addition, when the $3^{rd}$ speed and reverse clutch 23 is brought into engagement, the $3^{rd}$ speed driving gear 13a and the reverse driving gear 14a rotate together with the input shaft 1. In this state, the $3^{rd}$ speed follower gear 13b and the transmission output shaft 2 are brought into engagement with each other by the $3^{rd}$ speed dog clutch 24, the rotations of the input shaft are transmitted from the $3^{rd}$ speed driving gear 13a rotating together with the input shaft 1 to the $3^{rd}$ speed follower gear 13b meshing with the $3^{rd}$ speed driving gear 13a, whereby the transmission output shaft 2 rotates at rotating speed which is changed so as to correspond to a gear ratio of the $3^{rd}$ speed gear train. Similarly, with the $3^{rd}$ speed and reverse clutch 23 being in engagement, when the reverse follower gear 14b and the output shaft 2 are brought into engagement with each other by the $3^{rd}$ speed and reverse dog clutch 24, the rotations of the input shaft are transmitted from the reverse driving gear 14a rotating together with the input shaft 1 to the reverse follower gear 14b meshing with the reverse driving gear 14a, whereby the transmission output shaft 2 rotates at rotating speed which is changed so as to correspond to a gear ratio of the reverse gear train.

A front wheel side driving gear 3a and a first rear wheel driving gear 31 are, as shown the figure, fixedly provided on the transmission output shaft 2 which is, as described above, adapted to be changed in speed so as to correspond to the respective gear trains and is driven to rotate at the respective rotating speeds, and these gears 3a, 31 are also driven to rotate together. The front wheel side driving gear 3a meshes with a front wheel side follower gear 3b integrally connected to the front differential mechanism FD so as to transmit the rotations of the transmission output shaft at a reduced rotating speed. As a result of this, the rotational driving force is split by the front differential mechanism FD to the left and right front wheels FW from the left and right front axle shafts FA, whereby the left and right front wheels FW are driven to rotate.

With a view to transmitting the rotational driving force to the rear wheels RW from the transmission output shaft 2, an intermediate rear wheel driving gear is rotatably disposed on the input shaft 1, and the intermediate rear wheel driving gear 32 meshes with the first rear wheel driving gear 31. Additionally, a rear wheel driving rotating shaft 35 extending in parallel with the input shaft 1 and the transmission output shaft 2 is rotatably disposed within the transmission housing HSG, and a second rear wheel driving gear 33 is fixedly provided on the rear wheel driving rotating shaft 35, the second rear wheel driving gear 33 meshing with the intermediate rear wheel driving gear 32. Furthermore, a third rear wheel driving gear 36 comprising a bevel gear is fixedly provided at an end of the rear wheel driving rotating shaft 35, and the third rear wheel driving gear 36 meshes with a fourth rear wheel driving gear 37 comprising a bevel gear fixedly provided at an inner end of a rear wheel driving output shaft 38 disposed in such a manner as to intersect with the rear wheel rotating shaft 35 at right angles. Note that a joint member 39 is provided at an outer end of the rear wheel driving output shaft 38, the joint member 39 linking up with the propeller shaft PS.

According to this construction, when the transmission output shaft 2 is driven to rotate as described above, the first rear wheel driving gear 31 rotates together with the transmission output shaft 2, and the rotations of the first rear wheel driving gear 31 are transmitted to the second rear wheel driving gear 33 via the intermediate rear wheel driving gear 32, whereby the rear wheel driving rotating shaft 35 is driven to rotate. Then, the rotations of the rear wheel driving rotating shaft 35 are transmitted to the rear wheel driving output shaft 38 via third and fourth rear wheel driving gears 36, 37 which include a set of bevel gears which mesh with each other. Thus, when the rear wheel driving output shaft 38 is driven to rotate, a rotational driving force so generated is transmitted to a rear differential mechanism RD via the propeller shaft PS and is then transmitted from the rear differential mechanism RD to the left and right rear wheels RW via left and right axle shafts RA, whereby the left and right rear wheels RW are driven to rotate.

In the construction described above, the driving force is obtained from the front wheel driving gear 3a fixed to the transmission output shaft 2 to the front wheels FW, and since the front wheel driving gear 3a is disposed independently from the first rear wheel driving gear 31, there is obtained the high degree of freedom with respect to a position where the front wheel driving gear 3a is disposed. Namely, the degree of freedom with respect to a position where the driving force is distributed to the front wheels becomes high. In addition, the distribution of the driving force to the rear wheels is performed using a linearly arranged gear train including the first rear wheel driving gear 31 fixed to the transmission output shaft 2, the intermediate rear wheel driving gear 32 rotatably disposed on the transmission input shaft 1 and the second rear wheel driving gear 33 fixedly provided on the rear wheel driving rotating shaft 35. Due to this, only an axial dimension is required which is needed for the disposition of the linear gear train, thereby making it possible to suppress the increase in dimension in the axial direction of the transmission.

Figure 4:
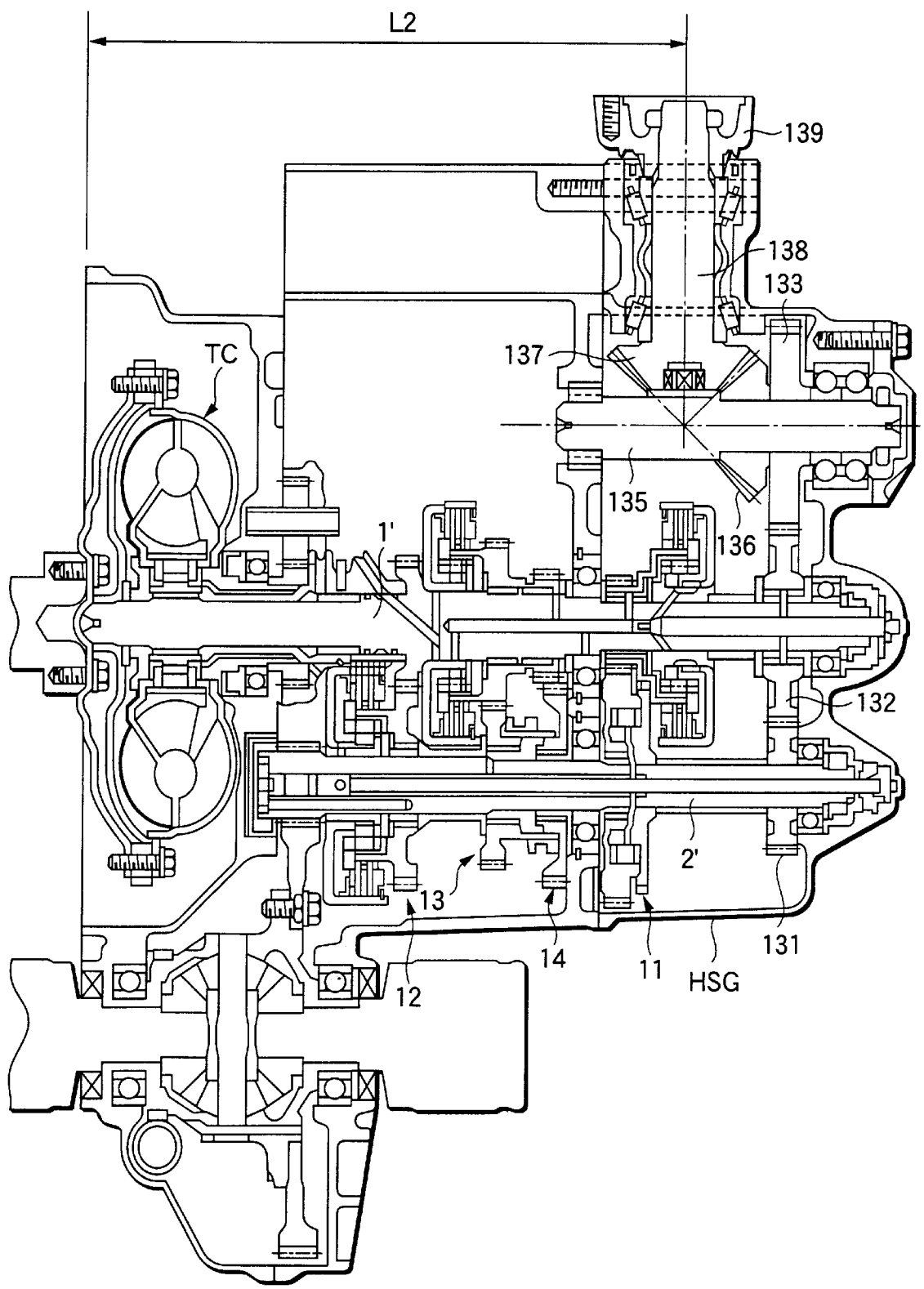
FIG. 4 is a view showing the construction of a transmission comprising a driving force distributing structure for a four wheel drive vehicle according to another embodiment of the invention.
Figure 5:
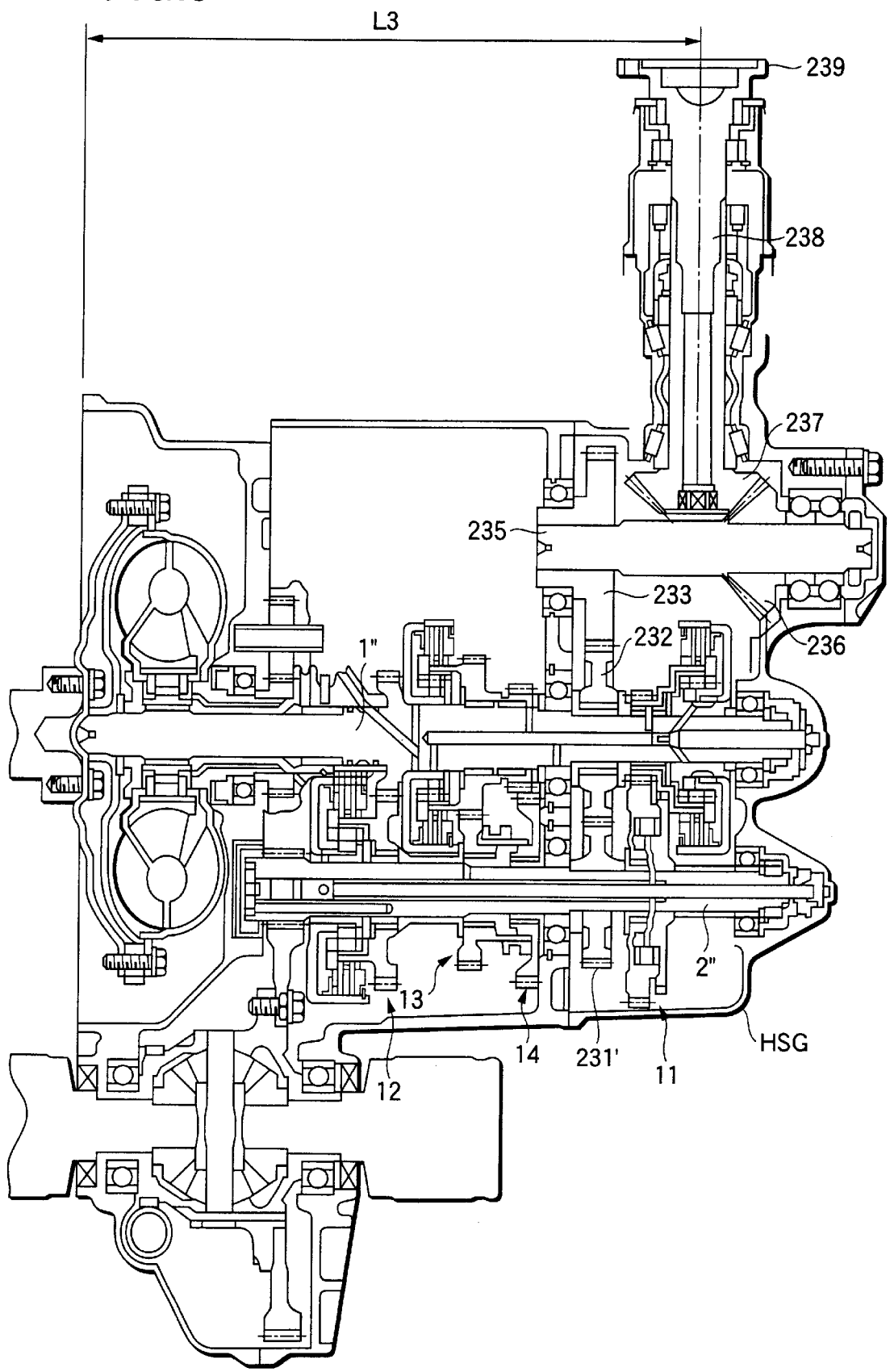
FIG. 5 is a view showing the construction of a transmission comprising a driving force distributing structure for a four wheel drive vehicle according to a still another embodiment of the invention.

Additionally, the degree of freedom with respect to a position where a driving force is distributed to the rear wheels can be increased by adjusting the position of the linearly arranged gear train as described above within the transmission housing. Examples are shown in FIGS. 4 and 5 in which the positions where the driving force is distributed to the rear wheels are modified. Note that in constructions shown in FIGS. 4 and 5, like reference numerals are given to like portions in the construction described with respect to FIG. 1, and portions of the constructions which are different from what is shown in FIG. 1 will be described below.

Figure 1:
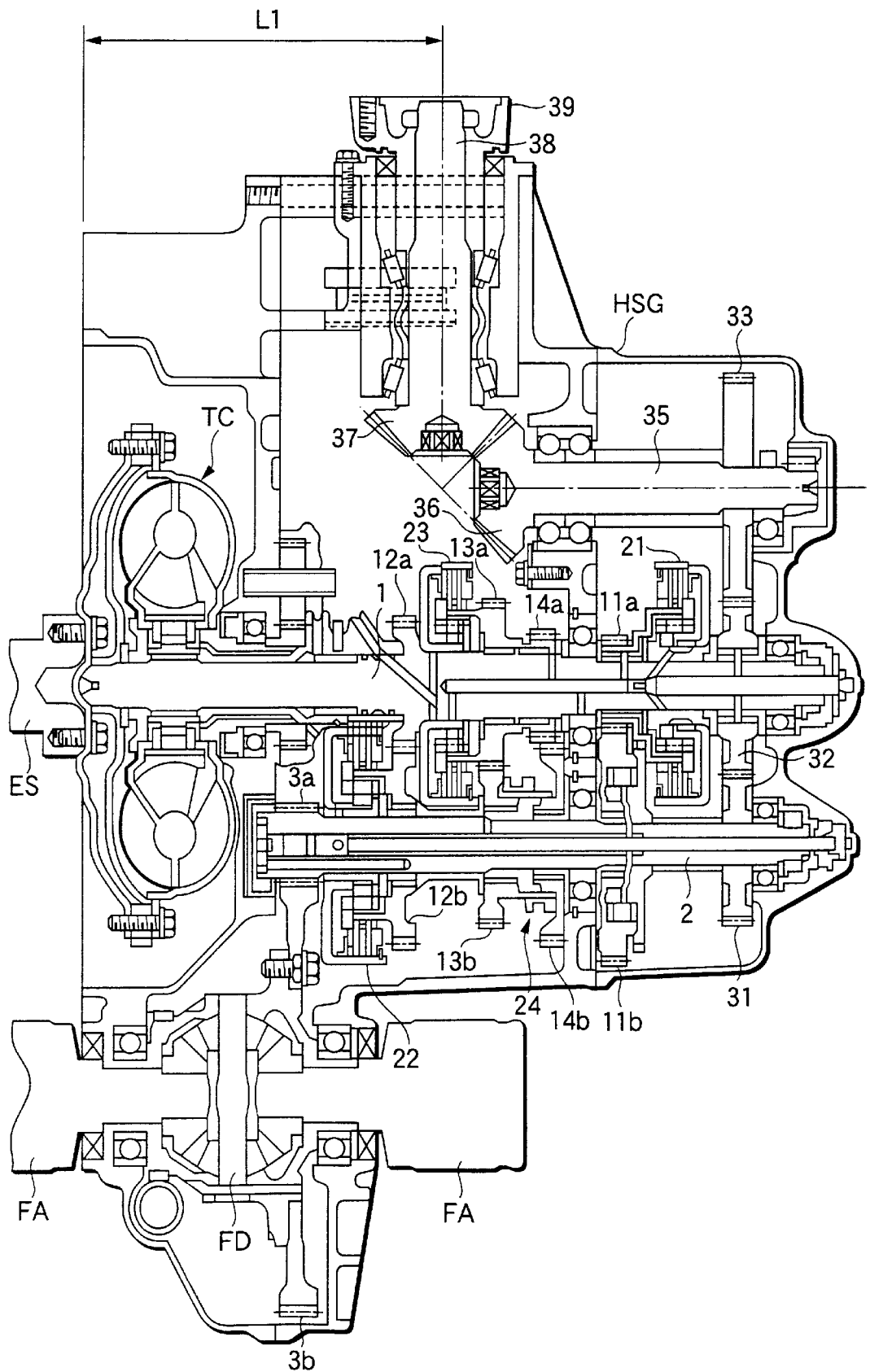
FIG. 1 is a view showing the construction of a transmission comprising a driving force distributing structure for a four wheel drive vehicle according to the invention.

First, in a transmission shown in FIG. 4, although positions of a first rear wheel driving gear 131, an intermediate gear 132 and a second gear 133 are substantially identical to those shown in FIG. 1, the shape of a rear wheel driving rotating shaft 135 is different, and a third rear wheel driving gear 136 is fixedly provided at an intermediate portion of the rotating shaft 135. Due to this, a fourth rear wheel driving gear 137 with which the third gear 136 meshes, an output shaft 138 and a joint member 139 are different in axial position from those of the corresponding gears and member shown in FIG. 1. Namely, as shown in the figures, distances L1, L2 from a joint surface of the transmission housing HSG with the engine to the rear wheel driving output shaft 38 or 138 are different from each other (L1<L2).

In addition, in a transmission shown in FIG. 5, a linearly arranged gear train including a first rear wheel driving gear 231, an intermediate gear 232 and a second gear 233 is positioned between a $1^{st}$ speed transmission mechanism 11 and a reverse transmission mechanism 14. Then, the shape of a rear wheel driving rotating shaft 235 is different, and a third rear wheel driving gear 236 is fixedly provided on a right-hand side portion of the rotating shaft 235. Due to this, a fourth rear wheel driving gear 237 with which the third gear 236 meshes, an output shaft 238 and a joint member 239 are different in axial position from those of the corresponding gears and member shown in FIGS. 1 and 2. Namely, as shown in the figures, distances L1, L2, L3 from a joint surface of the transmission housing HSG with the engine to the rear wheel driving output shaft 38, 138 or 238 are different from one another (L1<L2<L3).

As has been described heretofore, according to the invention, in distributing the driving force from the first gear fixed to the output shaft to, for example, the front wheels, since the first gear is disposed independently from the driving force distributing portion for the rear wheels, the degree of freedom with respect to the position where the first gear is disposed is increased, and the degree of freedom with respect to the position where the driving force is distributed to the front wheels is increased. In addition, in distributing the driving force to, for example, the rear wheels, since the linearly arranged gear train is used which includes the second gear fixed to the output shaft, the intermediate gear rotatably disposed on the input shaft and the third gear rotatably disposed on the rotating shaft disposed in parallel with the input shaft and adapted to mesh with the intermediate gear, only the axial dimension is required within the transmission which is needed for the disposition of the linearly arranged gear train, whereby the increase in dimension in the axial direction of the transmission can be suppressed. Furthermore, it is possible to relatively freely adjust the position of the linearly arranged gear train in the axial direction within the transmission, and the degree of freedom with respect to the position where the driving force is distributed to the rear wheels is relatively high.

What is claimed is:

1. A driving force distributing structure for a four wheel drive vehicle, comprising:

an input shaft and an output shaft disposed in parallel with each other;

a transmission having transmission mechanisms disposed between said input shaft and said output shaft;

an intermediate gear disposed on said input shaft to be rotatable relative to said input shaft;

a first gear fixed to said output shaft and transmitting a driving force to one of front and rear wheels;

a second gear fixed to said output shaft and meshing with said intermediate gear; and a third gear disposed rotatably about a rotating shaft parallel with said input shaft and said output shaft and meshing with said intermediate gear so as to transmit the driving force to the other of said front and rear wheels.

2. The driving force distributing structure according to claim 1, wherein said intermediate gear, said second gear and said third gear are linearly arranged in a direction perpendicular to said input shaft.

3. The driving force distributing structure according to claim 1, wherein said first gear is fixed to said output shaft to be positioned between said transmission and a torque converter disposed around said input shaft, in an axial direction of said output shaft.

4. The driving force distributing structure according to claim 1, wherein said rotating shaft includes a bevel gear at an end thereof.

5. The driving force distributing structure according to claim 1, wherein said rotation shaft includes a bevel gear secured to an intermediate portion thereof.

6. The driving force distributing structure according to claim 1, wherein said transmission mechanisms includes a first speed transmission mechanism, a second speed transmission mechanism, a third speed transmission mechanism and a reverse transmission mechanism, and said intermediate gear and said second gear are arranged between two of said first, second, third speed transmission mechanisms and said reverse transmission mechanism.

* * * * *